(12) United States Patent
Cerda Varela et al.

(10) Patent No.: US 12,313,041 B2
(45) Date of Patent: May 27, 2025

(54) FLUID FILM BEARING, ESPECIALLY FOR A ROTOR HUB IN A WIND TURBINE

(71) Applicant: Siemens Gamesa Renewable Energy A/S, Brande (DK)

(72) Inventors: Alejandro Cerda Varela, Copenhagen East (DK); Niels Karl Frydendal, Herning (DK); Kim Thomsen, Skørping (DK); Morten Thorhauge, Ry (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 204 days.

(21) Appl. No.: 17/920,294

(22) PCT Filed: Apr. 23, 2021

(86) PCT No.: PCT/EP2021/060737
§ 371 (c)(1),
(2) Date: Oct. 20, 2022

(87) PCT Pub. No.: WO2021/219517
PCT Pub. Date: Nov. 4, 2021

(65) Prior Publication Data
US 2023/0184227 A1    Jun. 15, 2023

(30) Foreign Application Priority Data
Apr. 28, 2020    (EP) .................................... 20171725

(51) Int. Cl.
F03D 80/70    (2016.01)
F16C 17/10    (2006.01)
(Continued)

(52) U.S. Cl.
CPC ............ F03D 80/70 (2016.05); F16C 17/105 (2013.01); F16C 17/107 (2013.01); F16C 17/26 (2013.01);
(Continued)

(58) Field of Classification Search
CPC ........ F16C 17/03; F16C 17/035; F16C 17/06; F16C 17/24; F16C 17/105; F16C 17/107;
(Continued)

(56) References Cited

U.S. PATENT DOCUMENTS

| | | |
|---|---|---|
| 4,223,958 A | 9/1980 | Gray |
| 4,764,034 A | 8/1988 | Fust et al. |

(Continued)

FOREIGN PATENT DOCUMENTS

| | | |
|---|---|---|
| AT | 521687 B1 | 4/2020 |
| CA | 2767461 A1 | 1/2011 |

(Continued)

OTHER PUBLICATIONS

PCT International Search Report and Written Opinion of International Searching Authority mailed Jun. 7, 2021 corresponding to PCT International Application No. PCT/EP2021/060737 filed Apr. 23, 2021.

*Primary Examiner* — Alan B Waits
*Assistant Examiner* — Aimee Tran Nguyen
(74) *Attorney, Agent, or Firm* — Schmeiser, Olsen & Watts, LLP

(57) ABSTRACT

A fluid film bearing, includes a first and second part, wherein the first part includes at least two annular sliding surfaces, wherein the second part includes a respective group of pads for each of the annular sliding surfaces, wherein a respective pad sliding surface of each pad in a respective group supports the respective annular sliding surface, wherein the pads of each group are distributed in the circumferential (Continued)

direction along the second part, wherein at least one pad of a selected one of the groups is arranged such that spacing of the pads in the selected group along the circumference is irregular and/or wherein the selected or a selected one of the groups includes two different types of pads and/or wherein the pads of the or a selected one of the groups are offset in the circumferential direction with respect to the pads of a further one of the groups.

11 Claims, 8 Drawing Sheets

(51) Int. Cl.
  *F16C 17/26* (2006.01)
  *F16C 27/02* (2006.01)
  *F16C 32/06* (2006.01)
  *F16C 33/10* (2006.01)

(52) U.S. Cl.
  CPC .......... *F16C 27/02* (2013.01); *F16C 32/0666* (2013.01); *F16C 32/0677* (2013.01); *F16C 32/0696* (2013.01); *F16C 33/108* (2013.01); *F05B 2240/53* (2013.01); *F16C 2360/31* (2013.01)

(58) Field of Classification Search
  CPC .............. F16C 32/0677; F16C 32/0686; F16C 32/0696; F16C 33/108; F16C 2360/31; F03D 80/70; F05B 2240/53
  See application file for complete search history.

(56) References Cited

U.S. PATENT DOCUMENTS

| | | |
|---|---|---|
| 10,072,704 B2 | 9/2018 | Sato et al. |
| 2008/0095482 A1 | 4/2008 | Swann |
| 2011/0188988 A1 | 8/2011 | Wadehn |
| 2013/0071246 A1 | 3/2013 | Kari et al. |
| 2014/0086516 A1 | 3/2014 | Pedersen et al. |
| 2014/0193264 A1 | 7/2014 | Pedersen et al. |
| 2017/0260970 A1 | 9/2017 | Stiesdal |
| 2018/0030964 A1 | 2/2018 | Eriksen et al. |
| 2019/0085829 A1* | 3/2019 | Frydendal ............. F16C 33/121 |
| 2020/0040941 A1 | 2/2020 | Lüneburg et al. |
| 2021/0388820 A1 | 12/2021 | Hoelzl |

FOREIGN PATENT DOCUMENTS

| | | |
|---|---|---|
| DE | 102017105577 A1 | 9/2018 |
| EP | 2568167 A1 | 3/2013 |
| EP | 2657519 A1 | 10/2013 |
| EP | 2558718 B1 | 11/2016 |
| EP | 2796740 B1 | 3/2017 |
| EP | 3252306 A1 | 12/2017 |
| EP | 3276192 A1 | 1/2018 |
| EP | 3428448 A1 | 1/2019 |
| EP | 3460269 A1 | 3/2019 |
| EP | 3594495 A1 | 1/2020 |
| GB | 582967 A | 12/1946 |
| JP | H07122444 A | 5/1995 |
| JP | H07122444 B2 | 12/1995 |
| JP | 2000065047 A | 3/2000 |
| JP | 2016080119 A | 5/2016 |
| WO | 2011127510 A1 | 10/2011 |
| WO | 2013034391 A2 | 3/2013 |
| WO | 2013191163 A1 | 12/2013 |

* cited by examiner

FLUID FILM BEARING, ESPECIALLY FOR A ROTOR HUB IN A WIND TURBINE

CROSS-REFERENCE TO RELATED APPLICATIONS

This application claims priority to PCT Application No. PCT/EP2021/060737, having a filing date of Apr. 23, 2021, which claims priority to EP Application No. 20171725.3, having a filing date of Apr. 28, 2020, the entire contents both of which are hereby incorporated by reference.

FIELD OF TECHNOLOGY

The following relates to a fluid film bearing, especially for a rotor hub in a wind turbine, comprising a first and a second part rotatably connected to each other. Additionally, the following relates to a wind turbine.

BACKGROUND

Wind turbines generally comprise a hub to which the rotor blades are mounted, wherein the hub is rotatably supported by a nacelle or some other component of the wind turbine. The hub is typically coupled to the rotor of a generator either directly to form a direct drive wind turbine or via a gear box. The hub can be supported by one or multiple bearings. Typically, such bearings are formed as roller bearings. Since a high degree of precision is needed when machining these bearings, those bearings are typically very expensive and wear and tear can result in damage to the bearings. To replace the damaged part, it is generally necessary to dismantle the complete bearing. Therefore, the replacement procedure is expensive and can lead to long down times.

A sliding bearing to replace such a ball or roller bearing is e.g. known from the document EP 3276192. The disclosed configuration requires two bearings to support the drive shaft at both ends of a housing. Additional further components, e.g. a thrust bearing or a thrust collar, are needed to axially support the hub. An alternate bearing configuration that allows for the use of a single bearing in a wind turbine is e.g. disclosed in the document WO 2013/034391 A2. This bearing uses closely spaced pads that are mounted on a rotating outer ring of the bearing, that is connected to the hub.

SUMMARY

An aspect relates to further improving a bearing, especially for the use in a wind turbine, and especially to reduce the complexity of a wind turbine using such a bearing, reduce wear and tear and/or improve the serviceability of the bearing.

The problem is solved by a fluid film bearing, especially for a rotor hub in a wind turbine, comprising a first and second part rotatably connected to each other, wherein the first part comprises at least two annular sliding surfaces that extend in the circumferential direction of the bearing along the first part and that are arranged at an angle to each other, wherein the second part comprises a respective group of pads for each of the annular sliding surfaces, wherein a respective pad sliding surface of each pad in a respective group supports the respective annular sliding surface, wherein the pads of each group are distributed in the circumferential direction of the bearing along the second part, wherein firstly at least one pad of a selected one of the groups is arranged in such a way that the spacing of the pads in the selected group along the circumference is irregular and/or wherein secondly the selected or a selected one of the groups comprises two different types of pads and/or wherein thirdly the pads of the or a selected one of the groups are offset in the circumferential direction with respect to the pads of a further one of the groups.

The use of at least two annular sliding surfaces and the respective groups of pads supporting these sliding surfaces allows for a combined support in the radial and the axial direction by the same bearing. It is e.g. possible to use a first annular sliding surface that is essentially orthogonal to the radial direction and associated radial pads to provide radial support and to use two groups of pads supporting further annular sliding surfaces arranged at an angle to the axial direction of the bearing to provide axial support in both axial directions. Alternatively, it would e.g. be possible to use two annular sliding surfaces supported by respective groups of pads that are arranged at an angle to both the radial and the axial direction of the bearing. In this case, each group of pads can provide support in the radial direction and in on direction in the axial direction.

The options described concerning the placement and the type of the pads allow for a lower complexity and cost of the bearing. An irregular spacing of the pads of one group may be especially advantageous when the axial direction of the bearing is approximately parallel to the horizontal direction, e.g. at an angle of less than 30° or less than 15° to the horizontal direction. This is typical for the bearing of a hub of a wind turbine. In this case, the radial support is mainly required to compensate the pull of gravity on the hub. Therefore, it is e.g. possible to position all or a majority of the pads that should provide radial support in the top half of the circumference when they are mounted to the inner part of the bearing or to the bottom half of the circumference when they are mounted to the outer part of the bearing. This can reduce the number of required pads and therefore the complexity, the cost and the weight of the bearing.

In general, an irregular spacing of the pads of the selected groups results in an arrangement, wherein not all neighbouring pads of the selected group are equidistant when measured around the circumference in a given measuring direction. This can e.g. be the case when the bearing comprises at least three pads of this group and one of them is shifted in such way that it is closer to one of its neighbours than to the other one of its neighbours. Alternatively, it is e.g. possible to have two pads clustered in a certain sector of the circumference of the bearing, such that there is one relatively small and one relatively large distance between the pads along the circumference. The distance between the pads can e.g. vary by at least 10% or at least 30% or at least 50% in the selected group.

As previously discussed, the loading of the bearing in the radial direction will be dominated by the pull pf gravity in most usage situations. It may however be advantageous when the bearing can also handle unexpected or rare load events, e.g. during rare wind conditions or during the mounting and/or servicing of the wind turbine. It can therefore be advantageous to still place at least some of the pads in the top half of the circumference of the bearing when the pads are mounted to the outer part or to the bottom half of the circumference of the bearing when the pads are mounted to the inner part to handle such rare load events. It is possible that a lower number of pads is used to handle these rare load events. Alternatively or additionally, it can however also be advantageous to use different types of pads in different positions. Pads that mainly provide support during rare loading events can be designed in such a way that their lifetime would be lower when they would see the same amount of use as the other pads. Since these pads are rarely fully loaded, they can still achieve approximately the same lifetime as other pads.

As previously discussed, the fluid film bearing according to embodiments of the present invention uses at least two annular sliding surfaces with respective groups of pads to support these sliding surfaces. The simplest approach of supporting the annular sliding surfaces would be to place pads of all groups at each circumferential position where support is desired. The drawback of this approach is that the different groups of pads needed to be spaced slightly apart in the axial direction therefore extending the length of the bearing in the axial direction. By offsetting the pads of at least one of the groups in the circumferential direction with respect to the pads of a further one of the groups, the pads of these groups can be placed in such a way that they would overlap in the axial direction if placed at the same circumferential position, therefore shortening the bearing. A shorter bearing can reduce the amount of material required for the bearing and therefore reduce the cost and weight of the bearing. Additionally or alternatively, the described offset between groups can be used to allow for a larger pad sliding surface of the pads of at least one of the groups, especially for the group or groups providing radial support, without requiring a longer bearing.

When at least three groups of pads are used, e.g. one group providing a radial support and two groups providing an axial support, it can e.g. be possible to only offset the pads providing the radial support from the pads providing the axial support. It is however also possible to also offset the two groups of pads providing axial support with respect to each other.

In a fluid film bearing lubricant needs to be provided to the contact area between the different sliding surfaces. Multiple approaches to this lubrication are known in the prior art and will not be discussed in detail. The lubrication can e.g. be a flooded lubrication, a direct lubrication, a lubrication by spray bar or some other kind of lubrication. In an embodiment oil may be used as lubricant in the fluid film bearing. In an embodiment, the fluid film bearing may be a hydrodynamic bearing or alternatively a hydrostatic bearing. It is also possible to use a combination of these bearing types with some of the pads lubricated by a hydrodynamic lubrication and some of the pads lubricated by a hydrostatic lubrication. To avoid excess leakage of the lubricant, connections between different parts of the bearing may be sealed in embodiments. For simplicity's sake the sealing between the parts is not shown or discussed in the application, since implementations of such seals are well known in the prior art.

In a fluid film bearing the support of one sliding surface by another sliding surface involves an indirect transfer of forces, since a thin lubrication film is arranged between these surfaces. In some cases, e.g. at low rotational speeds in a hydrodynamic bearing or when pumps providing the lubricant are not running in a hydrostatic bearing, the respective sliding surfaces might be in direct contact and therefore the support might be achieved by a direct exchange of forces.

The number of the pads of the selected group in a first half of the circumference of the bearing can be higher than the number of pads of the selected group in the second half of the circumference of the bearing. Alternatively or additionally, the pads of a first type can be arranged in the first half of the circumference of the bearing and the pads of a second type can be arranged in the second half of the circumference of the bearing. As previously discussed, this can e.g. be advantageous when the axial direction is approximately horizontal to provide a strong support against gravity.

Only one of the types of pads can use a coating to form the pad sliding surface or different types of pads can use different materials for that coating. Alternatively or additionally, the different types of pads can use different materials to form a respective contact section of the pads carrying the coating or forming the pad sliding surface. Additionally or alternatively, the different types of pads can use different mechanisms to allow for a tilting of the contact section.

Pads used in bearings typically comprise the contact section discussed above and a support section used to mount the contact section to a mounting surface. The mechanism connecting the contact section and the support section typically allows the contact section to tilt in at least one direction to compensate for slight misalignments of the first and second part and for tolerances. Various approaches for providing such pads are known in the prior art and will therefore not be discussed in detail. It should be noted that in some cases only the contact section is considered to be the pad and the support section is considered to be the pad support. In embodiments of the invention that do not focus on the individual sections of the pad, the combination of the discussed sections will simply be referred to as pad.

Materials used to form the contact section can e.g. be different types of steel. The coating or coatings can be chosen from e.g. babbitt, white metal, a polymer or some other coating. Examples for mechanisms that allow for a tilting are a pivot, a bolt-in-socket connection or a flex support. Flex supports can e.g. be formed by forming a support part and the contact section of the pad from the same material and connecting these sections by a connecting part made from the same material but having a smaller diameter and therefore a certain flexibility to allow for a slight tilting of the pad sliding surface. Different combinations of the mentioned variations lead to different a cost, weight and robustness of the pads and can therefore be used to provide at least two types of pads used in the bearing to optimize these parameters.

The annular sliding surface supported by the pad sliding surfaces of the pads of the selected group can be arranged at an angle to the radial direction of the bearing. In other words, the pads of the selected group can be radial pads that provide at least a certain amount of radial support to that sliding surface. As previously mentioned, using the bearing for a hub of a wind turbine will lead to an approximately horizontal axial direction. Therefore, the amount of necessary axial support is approximately constant around the circumference of the bearing and mainly the necessary amount of radial support varies. Therefore, it may be especially advantageous to vary the type or spacing of the radial pads in embodiments.

Such radial pads can e.g. be formed by groups of pads having their pad sliding surfaces at an angle of at least 10° or 20°, for example between 35° and 55° in some embodiments, to the radial and the axial direction and facing in different axial directions. These types of pads will provide a radial support and an axial support at the same time. Alternatively, it would be possible to use at least one group of radial pads that are essentially orthogonal to the radial direction, e.g. arranged at an angle of less than 15° or 10° or 5° to the radial direction. At least one additional group, for example, two additional groups in some embodiments, of pads can be used to provide axial support. These can be approximately orthogonal to the axial direction.

Generally speaking, pads or sliding surfaces arranged at an angle to the radial direction can be identified as radial pads or radial sliding surfaces. Pads and sliding surfaces arranged at an angle to the axial direction can be identified as axial pads or axial sliding surfaces.

In an exemplary embodiment the first part may be an outer part of the bearing, wherein at least one of the annular sliding surfaces is formed on the inner circumference of the first part and/or wherein the respective pad sliding surface of the pads of at least one of the groups has a convex shape. In an embodiment all groups that support an annular sliding surface that is at an angle to the radial direction may be convex to match the surface of the annular sliding surface that is also convex. The first part can therefore be identified as the outer part of the bearing and the second part as the inner part of the bearing.

Using pads mounted to the inner part, that can especially be static, instead of the outer part, that can especially be rotatable, allows for an easier access to the pads, especially when the fluid film bearing is used in a wind turbine. In this case the inner part typically has the approximate shape of a tube in the area of the bearing. Therefore, the inner part forms a natural crawl space or even a larger access space for personal to access the wall of the inner part to which the pads can be mounted. As discussed in more detail below, the mounting of the pads on the inner part can also help to avoid acute angles at the circumferential ends of the pad sliding surfaces of the pad, which can also help to reduce wear and tear.

In an embodiment the respective pad sliding surface of pads providing radial support may have a convex shape. When the sliding surface has a convex shape, a tangent on any point of the sliding surface does not intersect the sliding surface. Compared to pads having a concave shape of the sliding surface acute angles at the edges of the radial pad sliding surface are avoided, which can help to increase the lifetime of the pad.

In an embodiment the radial pad sliding surface contacted by such pads can have the shape of a segment of a circle in a sectional plane orthogonal to the rotational axis of the bearing. In an embodiment this may be true for each sectional plane orthogonal to the rotational axis that intersects the radial pad sliding surface. The direction of the rotational axis can also be called axial direction.

The outer part sliding surface can have a circular shape in the discussed sectional plane or planes, leading to similar shapes of both sliding surfaces and therefore an improved support.

The first part can form an annular protrusion extending in the radial direction towards the second part, wherein the annular sliding surfaces are formed on the radial end of the protrusion and on both axial ends of the protrusion, wherein a first group of pads is arranged on one side of the protrusion and a second group of pads is arranged on the opposite side of the protrusion in the axial direction. The annular sliding surface formed on the radial end of the protrusion can be supported by the sliding surfaces of a third group of pads, that especially comprises the radial pads.

The protrusion can form an outer ring of the bearing. The protrusion can especially have an I-shaped cross-section in a sectional plane orthogonal to the circumferential direction of the bearing.

The first part can form an inner or outer annular section and two annular protrusions extending in the radial direction towards the second part from the annular section, wherein the annular sliding surfaces are formed on the annular section and the inner faces of the annular protrusions facing each other, wherein all pads are arranged between the annular protrusions.

The pad sliding surfaces of a first group of pads, especially of radial pads, can support the annular sliding surface formed on the annular inner or outer section. The pad sliding surfaces of a respective group of, especially axial, pads can support a respective annular sliding surface arranged on a respective protrusion. Since the annular sliding surfaces arranged on the protrusions face each other, axial support in both axial directions can be provided.

The inner or outer annular section and the two protrusions can form the inner or outer ring of a bearing having a U-shaped cross-section in a sectional plane orthogonal to the circumferential direction.

The normal of the pad sliding surface of two groups of pads providing radial support can be tilted with respect to the radial direction, wherein the pad sliding surfaces of a first one of these groups can be facing towards a first axial end of the bearing, and wherein the pad sliding surfaces of a second one of these groups can be facing towards a second axial end of the bearing.

The normal of these pad sliding surfaces can be tilted by an angle of less than 90° and more than 0°, for example, by an angle between 30° and 60° in some embodiments, e.g. by an angle of approximately 45°, with respect to the radial direction. By increasing the tilt angle, a stronger support by the pad in the axial direction is achieved while lowering the angle provides a stronger support in the radial direction. The tilting of the pads towards different ends of the bearing results in the radial pad sliding surfaces facing in different directions for different groups. Therefore, the two groups of pads provide axial support in both directions while still providing radial support.

The first part can form an annular protrusion extending in the radial direction towards the second part and forming two annular sliding surfaces, wherein the normal of the annular sliding surfaces is tilted with respect to the radial direction towards different ends of the bearing, wherein each of the annular sliding surfaces is supported in the axial and radial direction by one of the groups of the pads, wherein the outer part sliding surfaces are facing each other or facing away from each other.

The protrusion can especially form an inner or outer ring of the bearing that has a tapered I- or U-shaped cross-section in a sectional plane orthogonal to the circumferential direction. The annular sliding surfaces can especially be arranged in a V-shape in this sectional plane either on the axial ends the protrusion, e.g. when a ring with a tapered I-shape is formed, or in a recess formed by the protrusion, e.g. when a ring with a tapered U-shape is formed.

The pads of the first group can be arranged at different circumferential positions than the pads of the second group. This can allow for a shorting of the bearing in the axial direction, especially when a tapered U-shape of an inner or outer ring is used as discussed above, since pairs of pads of different groups, that provide axial support from both sides, do not need to be arranged at the same circumferential position and therefore at a different axial positions, but can be arranged inline along the circumference of the second part.

The first or second part can be formed, especially cast, as one piece and comprise a hub for a wind turbine. This can simplify the assembly of the wind turbine and potentially reduce the necessary amount of material and therefore especially the weight of the bearing and the hub. Alternatively, the first or second part can be attached to a hub of a wind turbine e.g. by a flange connection.

An inner or outer ring of the bearing, that can e.g. be formed by a protrusion of the first part as discussed above, can be a forged steel ring that can e.g. be hardened to obtain a wear and damage resistance surface. Alternatively, it can be a cast iron ring that can be coated with a coating to obtain a wear and damage resistant surface. Other implementations are also possible.

Embodiments of the invention also concern a wind turbine, comprising a rotor with a rotor hub that is connected to a further component of the wind turbine using a fluid film bearing according to embodiments of the present invention, wherein the hub is part of the first or second part or mounted to the first or second part. In an embodiment, the hub can be mounted to the outer one of the first and second parts. The connection between the respective part and the hub can be torque proof. In an embodiment, the other part may be connected to the nacelle and/or the stator of a generator, especially via a torque-proof connection. The part connected to the hub can also be connected to the rotor of a generator or to the input stage of gear box via a torque-proof connection.

The number of pads of the selected group in the top or bottom half of the circumference of the bearing can be higher than the number of pads of the selected group in the other half of the circumference of the bearing. Additionally or alternatively, the pads of the first type can be arranged in the top half of the circumference of the bearing and the pads of the second type can be arranged in the bottom half of the circumference of the bearing. These features were already discussed with respect to the bearing according to embodiments of the present invention. In an embodiment, the hub may be connected to the further component by a single bearing.

BRIEF DESCRIPTION

Some of the embodiments will be described in detail, with reference to the following figures, wherein like designations denote like members, wherein.

Figure 12:
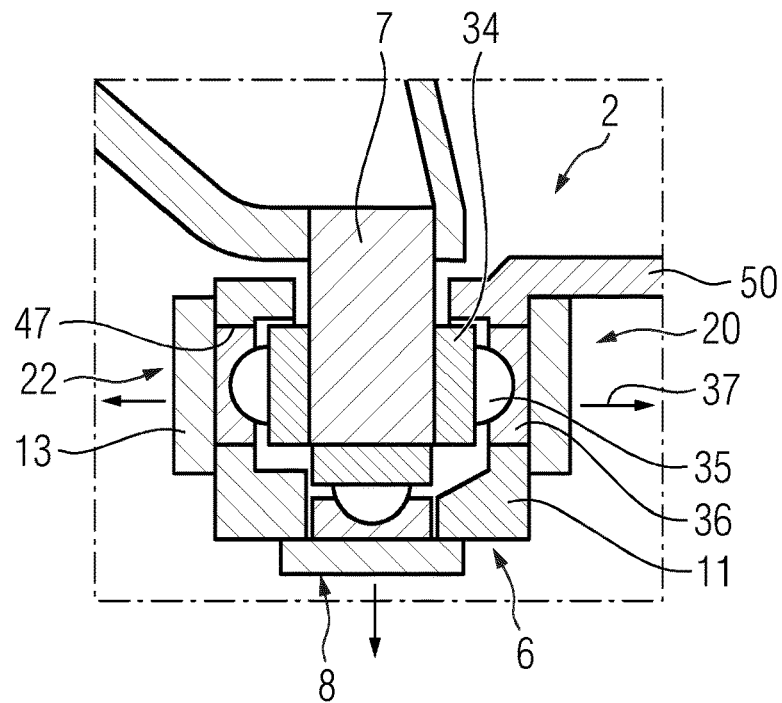
Figure 13:
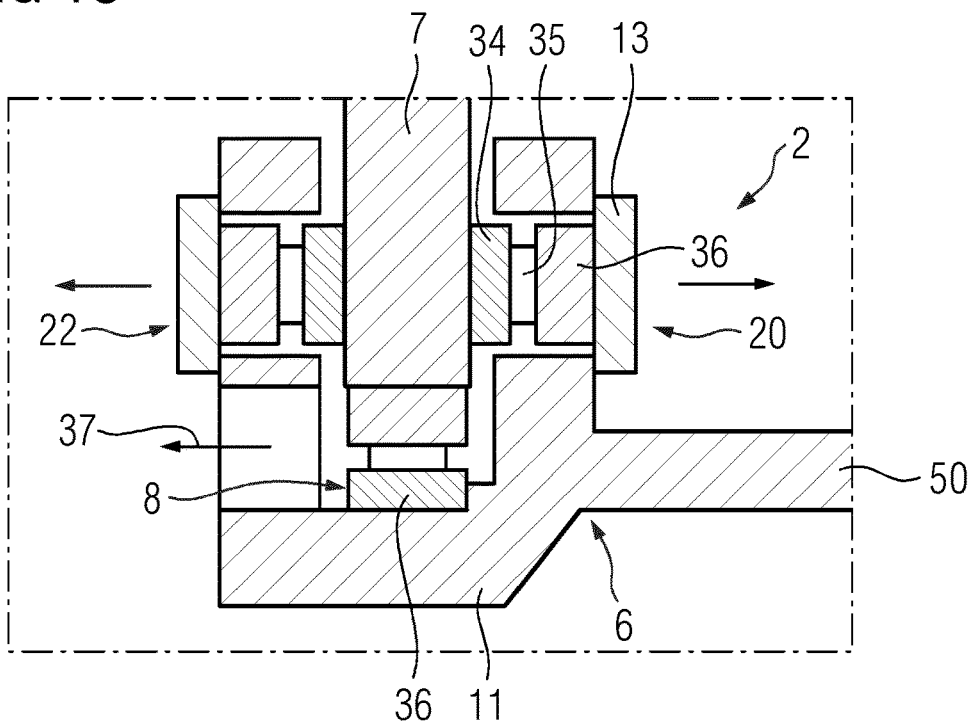

FIG. 12 shows a view of a further embodiment of a fluid film bearing according to an embodiment of the present invention that can be used in embodiments of a wind turbine according to an embodiment of the present invention; and FIG. 13 details a view of a further embodiment of a fluid film bearing according to an embodiment of the present invention that can be used in embodiments of a wind turbine according to an embodiment of the present invention.

DETAILED DESCRIPTION

Figure 1:
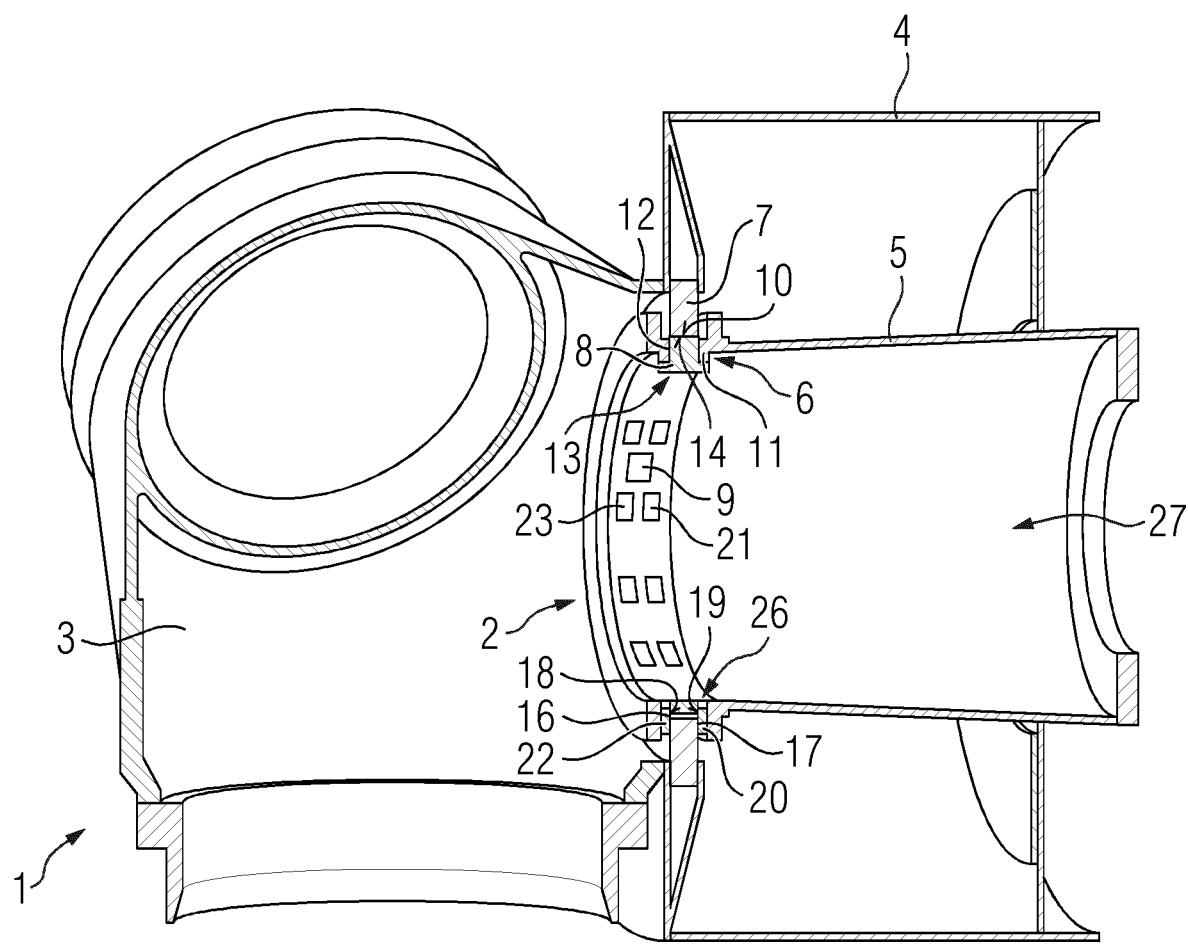
FIG. 1 shows a wind turbine according to an embodiment of the present invention comprising an a fluid film bearing according to an embodiment of the present invention.

FIG. 1 shows a detailed view of a wind turbine 1 that comprises a rotor hub 3 rotatably connected to a further component 5 of the wind turbine 1 using a fluid film bearing 2. The hub 3 is mounted to a first part 7 of the bearing 2 using a torque-prove connection. E.g. a flange connection can be used. Alternatively, the hub 3 and the first part 7 could be formed, e.g. cast, as a single piece.

The first part 7 is also connected to the structure 4 using a torque-prove connection. The structure 4 can be used to carry a rotor of a generator of the wind turbine 1 that is not shown in FIG. 1 for reasons of simplicity and clarity.

The second part 6 of the bearing has an annular shape and can be formed as one piece with the further component 5 or connected to the further component 5 using a torque-prove connection. The further component 5 can especially be or carry the stator of the generator of the wind turbine 1 that is not shown for reasons of simplicity and clarity.

Since embodiments of the present invention focuson the implementation and distribution of the various pads, details concerning the lubrication of the fluid film bearing, e.g. seals and pumps that can optionally be used to transport the lubricant, are omitted in the figures.

To radially support the first part 7, the second part 6 comprises a first group of pads 8, 9 distributed along the circumference of the second part 6. The pads 8, 9 of this group are arranged in such a way that the spacing of the pads 8, 9 along the circumference is irregular. In the example the pads 8,9 of the group providing radial support are only arranged in the upper half of the circumference. Alternatively, different numbers or types of pads could be used in different parts of the circumference. Such distributions may be advantageous, since the main load in the radial direction will typically be due to gravity acting on the hub 3.

Each of the pads 8, 9 has a respective pad sliding surface 10 that supports the annular sliding surface 14 of the first part 7 in the radial direction. The sliding surfaces 10, 14 can e.g. be coated to improve the robustness of the sliding surface and/or further reduce friction. While the sliding surfaces 10, 14 are typically not in direct contact during the normal operation, since a thin lubricant film is arranged between the sliding surfaces 10, 14, contact between the sliding surfaces 10, 14 can e.g. occur at slow rotating speeds or when pumps used to transport the lubricant are not working.

Figure 2:
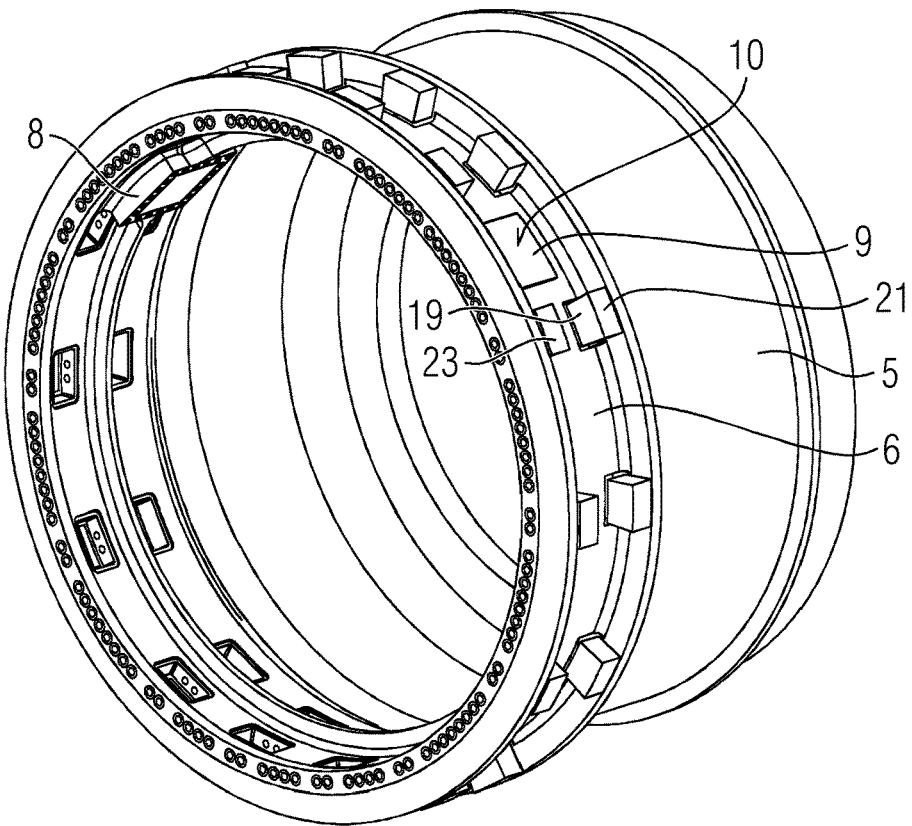
FIG. 2 shows a perspective view of the inner part of the bearing shown in FIG. 1.
Figure 3:
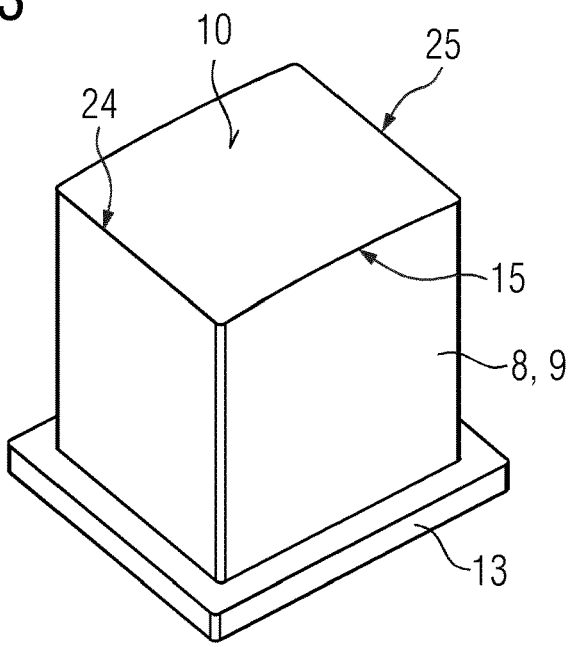
FIG. 3 shows the general shape of a radial pad used in the bearing shown in FIG. 1.

The pad sliding surface 10 does have a convex shape, as especially seen in FIGS. 2 and 3 that show the second part 6 without the surrounding first part 7 and a schematic illustration of the general shape of an individual pad 8, 9. As shown in FIG. 3 the pad sliding surface 10 at least approximates the shape of a segment 15 of a circle in a sectional plane orthogonal to the axial direction of the bearing 2. In FIG. 1 the axial direction coincides with the horizontal direction.

The convex shape of the pad sliding surface 10 closely matches the shape of the annular sliding surface 14, that is at least approximately circular in the same sectional plane. Another advantage of using a convex surface is an avoidance of acute angles at the edges 24, 25 of the pad sliding surface 10. This can help to reduce wear and tear of the pad sliding surface 10 and the annular sliding surface 14.

Concerning the general shape of the pads 8, 9 shown in FIG. 3 it should be noted that pads for a bearing and therefore also the pads 8, 9 and other pads that will be described later, typically allow a certain amount of tilting of the sliding surface of the respective pad with respect to a support section of the pad used to support the pad against a mounting surface or some other mounting point. The sliding surface is typically provided by a contact section that is mounted to the support section by a mechanism to allow for the tilting, e.g. by a pivot or a ball-in-socket connection. It is also possible to provide a flex support as the mechanism that allows tilting. In this case the contact section and the support section can be formed from the same material connected by a thinner part of the same material forming the mechanism allowing the tilting. While some of the later examples will show these distinct parts, the exact type of connection between the contact section and the support section is only relevant when different types of pads are used. Therefore, the pads are shown as single blocks of material in FIGS. 1-3 and some of the later figures for simplicity's sake.

In the example discussed with reference to FIGS. 1-3 the pads 8, 9 are radially inserted into through holes 12 of a main body 11 of the second part 6 of the bearing. In an embodiment they may comprise a base plate 13 that can be screwed or bolted to the main body 11. Since the radial forces exerted on the radial pad sliding surface 10 have to be absorbed by the connection elements used to connect the base plate 13 to the main body 11, it may be desirable to use a multitude of connection elements distributed around the circumference of the through hole 12 in embodiments, e.g. a multitude of screws or bolts.

In the discussed example the pad sliding surface 10 and the annular sliding surface 14 are essentially orthogonal to the radial direction and can therefore only support the first part 7 and therefore the hub 3 in the radial direction. To provide an axial support for the first part 7 and therefore the hub 3, the first part 7 has two additional annular sliding surfaces 16, 17 that are approximately orthogonal to the axial direction of the bearing 2. The annular sliding surface 17 is supported by pad sliding surfaces 19 of a second group of pads 20, 21. The annular sliding surface 16 is supported by pad sliding surfaces 18 formed by a third group of pads 22, 23. Therefore the first part 7 is supported in both axial directions.

As shown especially in FIG. 2, the pads 8,9 of the first group are offset in the circumferential direction with respect to the pads 20 to 23 of the second and third group. This allows for a shorter bearing 2 or the use of a sliding surface 10 of the pads 8, 9 that is larger in the axial direction without using a longer bearing 2.

In the sectional plane orthogonal to the circumferential direction of the bearing shown in FIG. 1 the annular first part 7 has approximately the shape of the letter "I" and forms a protrusion extending in the radial direction towards the second part 6. The annular sliding surface 14 is formed on the radial end of this protrusion and the annular sliding surfaces 16, 17 are formed on the axial ends of this protrusion.

The pads 20-24 can be exchanged by radially removing or inserting them through through holes 26 of the main body 11 of the inner part 6, such that they are sandwiched between the main body 11 and the first part 7. To allow for easy servicing of the pads 8, 9 and the pads 20-24 the hub 3 and the second part 6 and the further component 5 or a subgroup of these components can form an interior space 27 to allow personal to access the second part 6. As previously discussed, the pads 8, 9 and pads 20-24 are both inserted radially into the main body 11 of the second part 6 and are therefore easily accessible from such an interior space 27. As discussed later, e.g. with reference to FIGS. 12 and 13, other approaches for mounting the pads could also be used.

Figure 4:
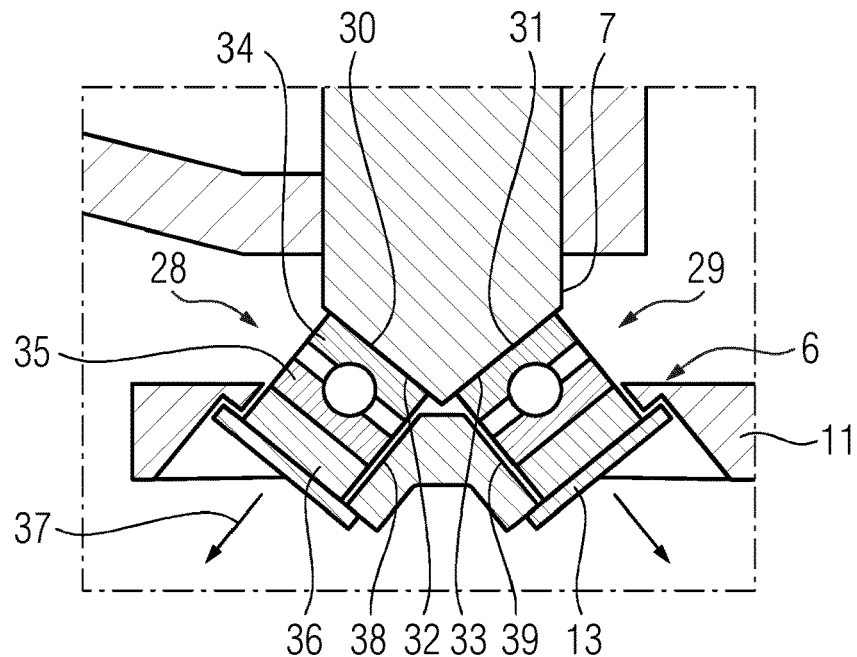
FIG. 4 shows a view of a further embodiment of a fluid film bearing according to an embodiment of the present invention that can be used in embodiments of a wind turbine according to an embodiment of the present invention.

In the previously discussed example, the pad sliding surface 10 providing radial support was essentially orthogonal to the radial direction. It was therefore necessary to use additional groups of pads 20-23 to achieve an axial support of the first part 7 and therefore the hub 3. FIG. 4 shows an alternative embodiment in which the first part 7 has a tapered shape forming two annular sliding surfaces 32, 33 that are essentially parallel to the circumferential direction of the bearing 2, but arranged at an angle to the radial and the axial direction of the bearing 2. The embodiment uses two groups of pads 28, 29, each group supporting a respective one of the annular sliding surfaces 32, 33. The respective normal of the pad sliding surfaces 30, 31 for the respective group of pads 28, 29 is tilted with respect to the radial direction. Therefore, the two groups of pads 28, 29 are sufficient to provide radial and axial support at the same time.

Multiple of these pairs of pads 28, 29 can be spaced along the circumference of the second part 6. In an embodiment the pads 28, 29 of both groups may be spaced irregularly around the circumference, e.g. using a larger number of pads 28, 29 in the upper part of the circumference. Alternatively or additionally, two different types of pads 28, 29 are used in different parts of the circumference. Both approaches are advantageous, since loads in the radial direction vary along the circumference, because the main load in radial direction is typically caused by gravity. This also holds true for the further embodiments described later.

To allow for easy servicing, the pads 28, 29 are mounted in through holes 38, 39 of the main body 11 of the second part 6. As previously described, a base plate 13 can be used to bolt, screw or otherwise attach the respective pad 28, 29 to the main body 11.

FIG. 4 also shows a more detailed structure of the individual pads 28, 29. Each of the pads 28, 29 comprise a support section 36 that comprises the base plate 13 for fixing the respective pad 28, 29 to the main body 11. The respective sliding surface 30, 31 is provided by a respective contact section 34, that can e.g. be coated to provide the respective sliding surface 30, 31. The mechanism 35 that connects the contact section 34 and the support section 36 can e.g. implement a ball-in-socket connection or some other means to allow a slight tilting of the respective pad sliding surface 30, 31. When different types of pads are used within a group of pads supporting the same annular sliding surface, as discussed below with reference to FIG. 8, one way to differentiate the different types of pads is to use a different mechanism 35 for different types of pads, e.g. a flex-connection for some of the pads and a ball-in-socket connection for the other pads in the group. The pads 28, 29 can easily be serviced by removing them as shown by the arrows 37, e.g. from within an interior space 27 shown in FIG. 1.

Figure 5:
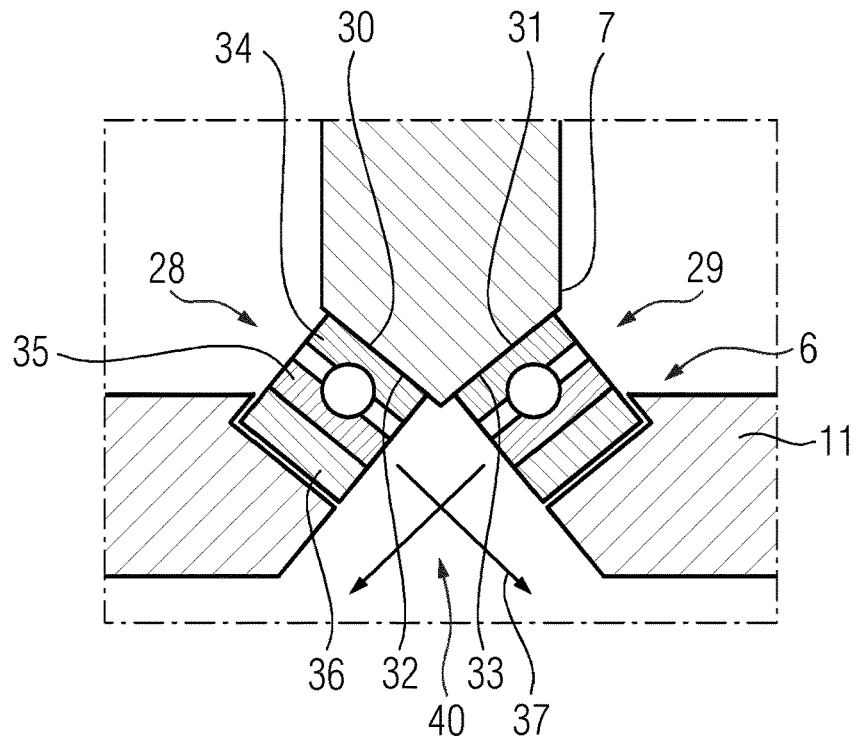
FIG. 5 shows a view of a further embodiment of a fluid film bearing according to an embodiment of the present invention that can be used in embodiments of a wind turbine according to an embodiment of the present invention.

A slight variation of the previously discussed embodiment is shown in FIG. 5. Since most features are identical to the embodiment shown in FIG. 4 the same labels are used for the different components. The main difference between these embodiments is the mounting of the pads 28, 29 to the main body 11 of the first part 6. While the embodiment discussed with reference to FIG. 4 allows for an especially easy removal of the pads 28, 29, since they can even be removed when loaded by a force from the first part via the pad sliding surfaces 30, 31, the drawback of this embodiment is that the fixing means, with which the respective base plate 13 is fixed to the main body 11, need to support the pads 28, 29 against any forces exerted by the first part 7 onto the radial pad sliding surfaces 30, 31.

When the embodiment shown in FIG. 5 is used, forces exerted by the first part 7 via the pad sliding surfaces 30, 31 are directly transferred to the main body 11 of the inner part 6. In this case the pads 28, 29 cannot be removed parallel to the axis of support. Instead they are removed orthogonal to this axis as shown by the arrows 37 in FIG. 5. The pads 28, 29 can e.g. be accessed by a common opening 40 from the interior space 27 shown in FIG. 1.

Figure 6:
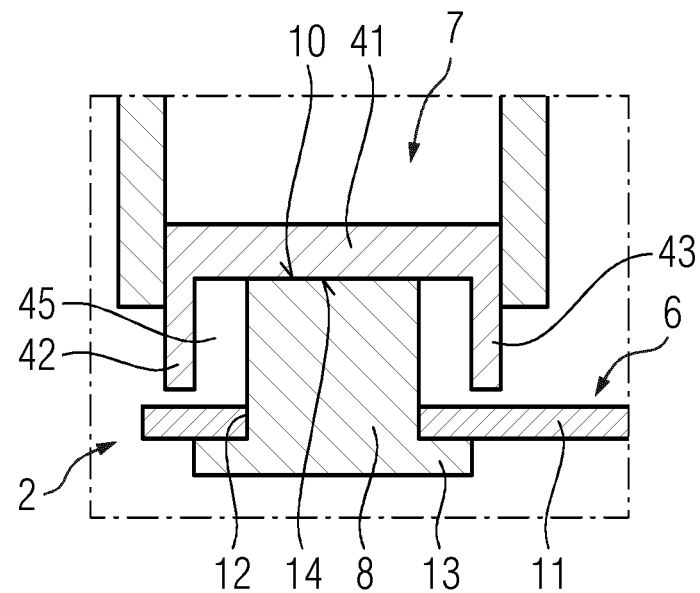
FIG. 6 shows a view of a further embodiment of a fluid film bearing according to an embodiment of the present invention that can be used in embodiments of a wind turbine according to an embodiment of the present invention.
Figure 7:
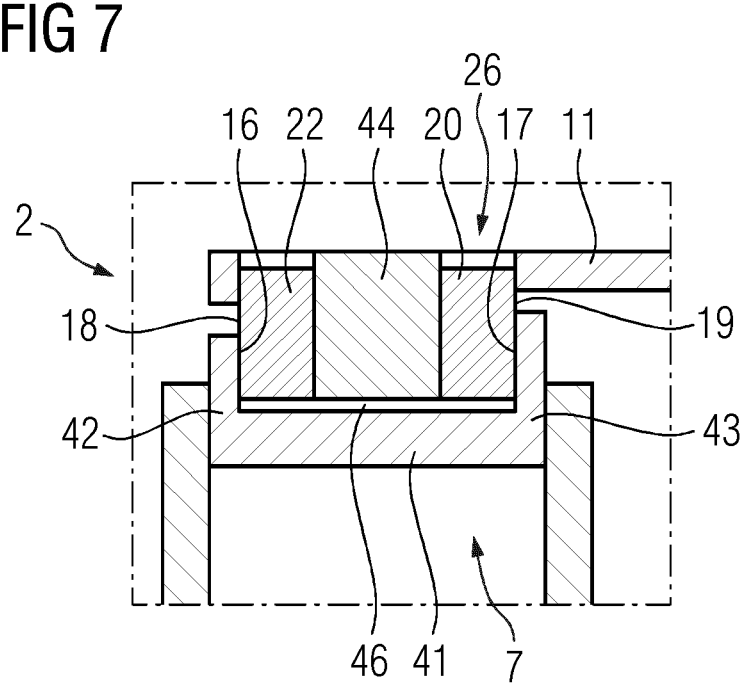
FIG. 7 shows a view of a further embodiment of a fluid film bearing according to an embodiment of the present invention that can be used in embodiments of a wind turbine according to an embodiment of the present invention.
Figure 8:
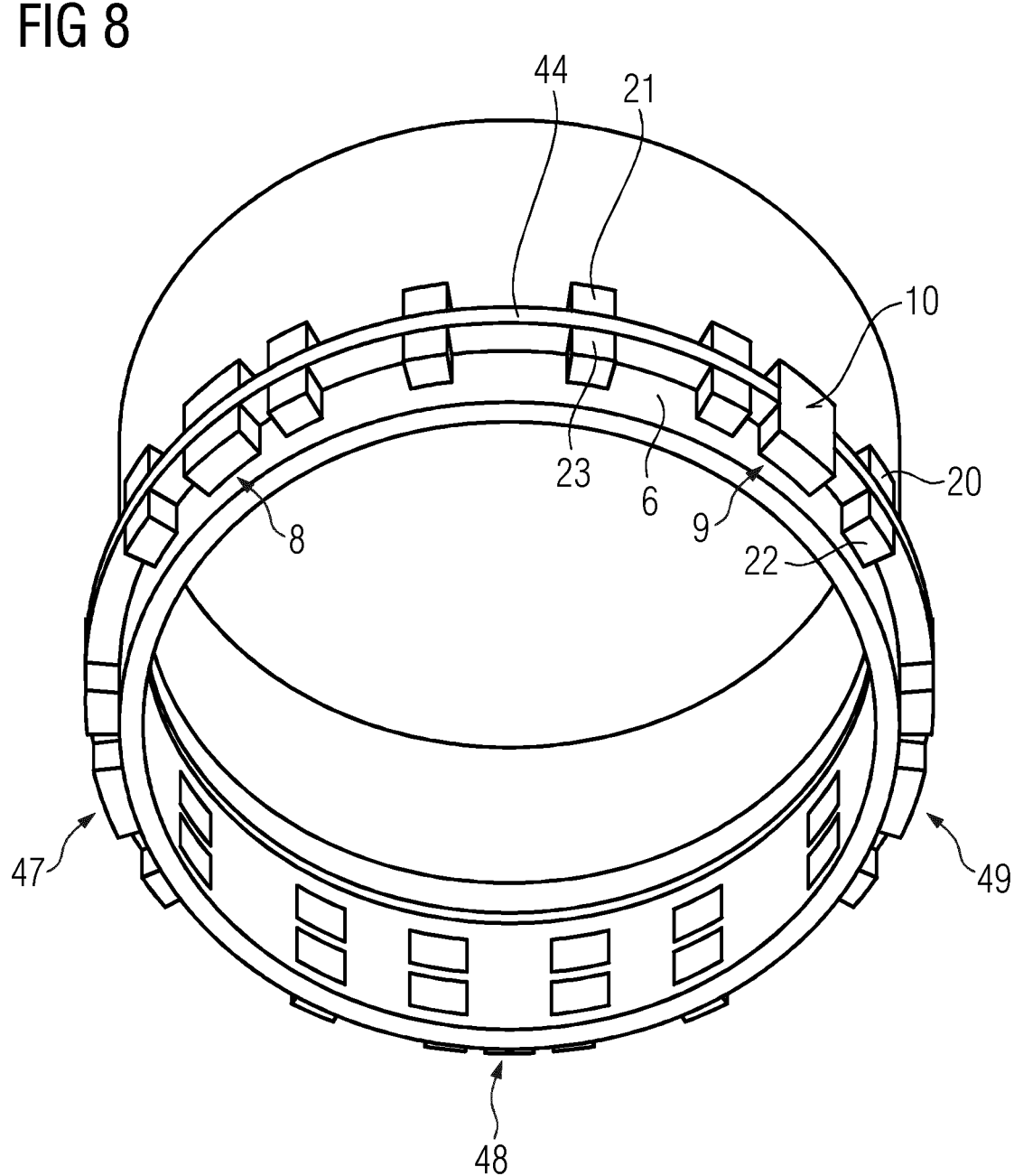
FIG. 8 shows a view of a further embodiment of a fluid film bearing according to an embodiment of the present invention that can be used in embodiments of a wind turbine according to an embodiment of the present invention.

FIGS. 6, 7 and 8 show an alternate embodiment that is similar to the embodiment discussed with reference to FIGS. 1-3 insofar as separate groups of pads are used for the radial and the axial support. A first difference between these embodiments is the shape of the first part 7. While the first part 7 has an I-shape in a sectional plane orthogonal to the circumferential direction of the bearing 2 in the embodiment of FIGS. 1 to 3, the embodiment according to FIGS. 6-8 uses an first part 7 with a U-shape in such a sectional plane that is formed by an annular outer section 41 and two protrusions 42, 43 extending from this annular outer section 41 towards the first part 6, as shown in FIGS. 6 and 7.

Like in the previously discussed embodiment, the pads 8, 9, 47, 48, 49 that provide a radial support and the pads 20-23 that provide an axial support to the first part 7 are provided in different positions along the circumferential direction of the bearing 2. This is e.g. obvious from FIG. 8 that shows a perspective view of the second part 6. Therefore FIGS. 6 and 7 show cross sections of the bearing 2 at different positions along the circumference of the bearing 2 to show the interaction of the pad 8 and of the pads 20, 22 with the first part 7.

As shown in FIG. 6 the annular sliding surface 14 is formed by the annular outer section 41. The pad 8 is mounted essentially in the same way to a main body 11 of the second part 6 as in the previously discussed embodiment. Since there is a relatively large gap 45 between the protrusions 42, 43 and the radial pad 8, only the pad sliding surface 14 interacts with the outer part 7.

As shown in FIG. 7, the pads 20, 22 are sandwiched between a support ring 44 formed by the main body 11 of the second part 6 and a respective protrusion 42, 43 of the outer part 7. Since there is a sufficiently large gap 46 between the pads 20, 22 and the annular outer section 41 of the first part 7, the axial pads 20, 22 only interact with the protrusions 42, 43 to axially support the first part 7. A respective pad sliding surface 18, 19 supports the respective annular sliding surface 16, 17. The annular sliding surfaces 16, 17 in FIG. 7 face each other while the annular sliding surfaces 16, 17 providing the same functionality in the embodiment according to the FIGS. 1-3 face away from each other.

A further difference of the discussed embodiment to the embodiment of FIGS. 1-3 is the use of additional pads 47, 48, 49 in the group of pads supporting the annular sliding surface 14, as shown in FIG. 8. Since the additional pads 47, 48, 49 are arranged in the lower half of the circumference of the bearing 2 and this group of bearings only provides a radial support, the bearings 47, 48, 49 will be hardly loaded during the normal operation of the bearing 2. They are therefore mainly used to provide additional radial support in rare loading situations, e.g. during the construction or servicing of a wind turbine or in rare wind conditions. It therefore may be advantageous to use two different types of pads in this group, a first type of pads 8, 9 providing support during normal operation and a second type of pads 47, 48, 49 to provide support in rare loading situations.

Since the pads 47, 48, 49 are rarely fully loaded, the second type of pad can be less robust or provide more friction when strongly loaded than the first type of pad. E.g. a different coating or no coating could be used for the pad sliding surfaces of the pads 47, 48, 49. Alternatively or additionally, a different mechanism to allow for tilting and/or different materials for other components of the pads 47, 48, 49 could be used. Therefore, the cost and weight of the additional pads 47, 48, 49 can be kept low.

Figure 9:
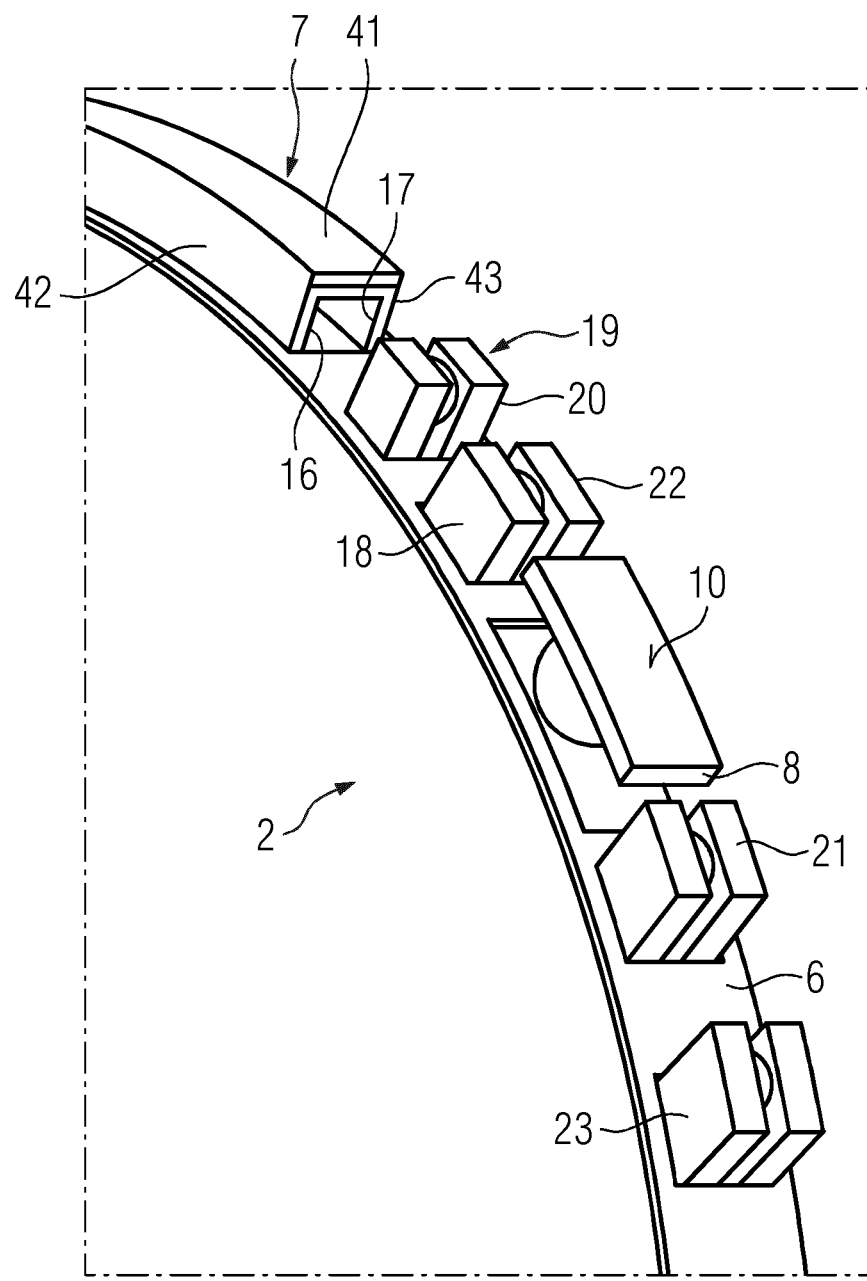
FIG. 9 shows a view of a further embodiment of a fluid film bearing according to an embodiment of the present invention that can be used in embodiments of a wind turbine according to an embodiment of the present invention.

FIG. 9 shows a variation of the embodiment discussed with reference to FIGS. 6-8. Only a small circumferential section of the bearing 2 is shown, wherein part of the first part 7 is cut away to show the arrangement of the pads 20-22 and one of the pad sliding surfaces 10 for radial support. To improve clarity, the different pads 20-22 are shown in a bit more detail and not simply as an outline as in the previous example.

The main difference between the embodiment according to FIG. 9 and the previously discussed embodiment is the arrangement of the different pads 20-22 providing axial support. In the previous embodiment two pads 20, 22 are arranged at a respective circumferential position, both of these pads 20, 22 being supported by the support ring 44. The embodiment according to FIG. 9 instead places all of the pads 20-22 for axial support in different circumferential positions. Therefore a first group of pads 20, 21 whose pad sliding surfaces 19 support the annular sliding surface 17 are placed in different circumferential positions than the pads 22, 23 of a second group, whose pad sliding surfaces 18 support the annular sliding surface 16 that is hidden by the protrusion 42 in FIG. 9. Using only a single pad 20-22 in each circumferential position can reduce the width of the bearing which can be advantageous in some cases.

Figure 10:
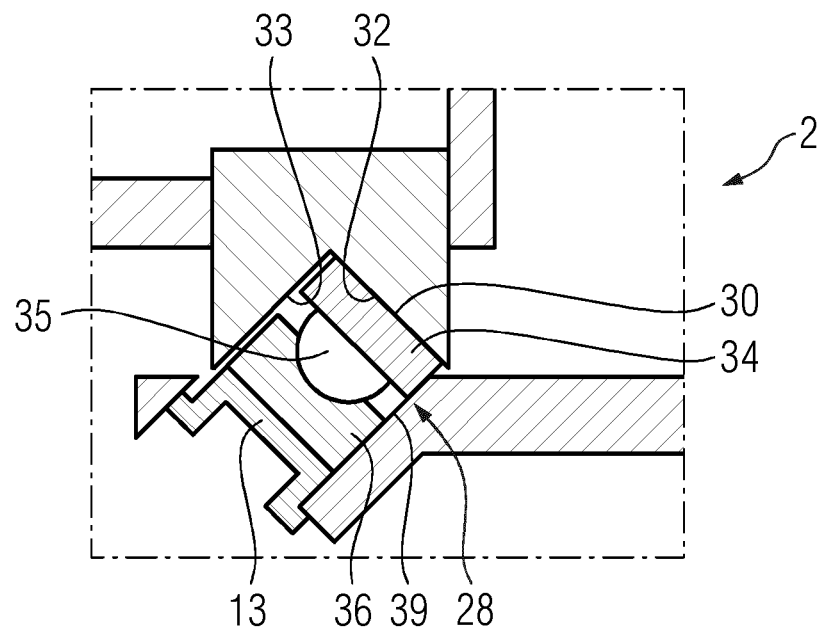
FIG. 10 shows a view of a further embodiment of a fluid film bearing according to an embodiment of the present invention that can be used in embodiments of a wind turbine according to an embodiment of the present invention.
Figure 11:
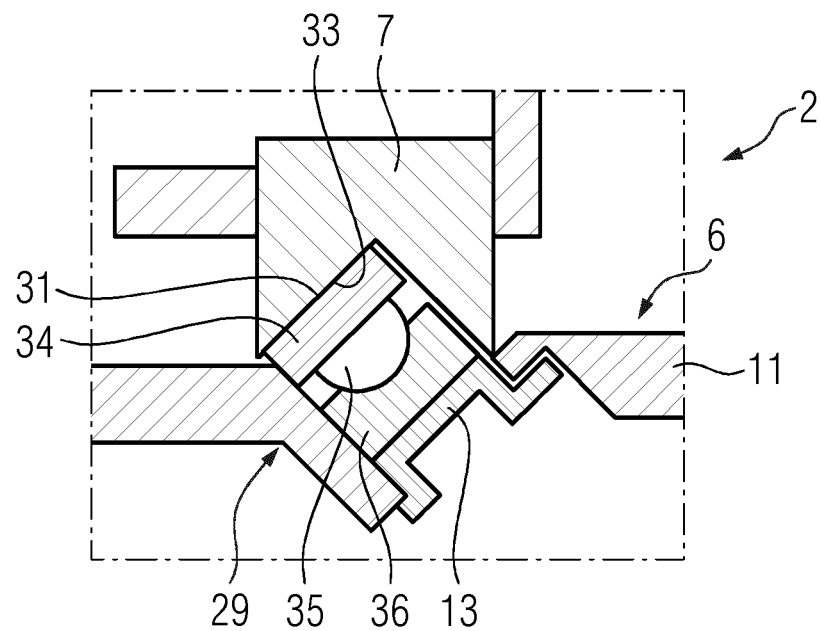
FIG. 11 shows a view of a further embodiment of a fluid film bearing according to an embodiment of the present invention that can be used in embodiments of a wind turbine according to an embodiment of the present invention.

A similar reduction in the width of the bearing 2 can be achieved for the embodiment previously discussed with reference to FIGS. 4 and 5 that uses two annular sliding surfaces 32, 33 that are both arranged at an angle to the radial and to the axial direction, therefore supporting the first part 7 in the axial and in the radial direction. Such an embodiment is now described with reference to FIGS. 10 and 11 that show cross sections orthogonal to the circumferential direction of the bearing 2 at different circumferential positions. Since the approach to supporting the first part 7 is similar as in FIGS. 4 and 5, the same reference numbers are used for components serving the same or similar purposes.

The first difference to the embodiment shown in FIGS. 4 and 5 is the shape of the first part 7. Instead of the tapered I-shape shown in FIGS. 4 and 5, the first part 7 now has a tapered U-shape with two protrusions with tapered ends forming the two annular sliding surfaces 32, 33. Therefore the annular sliding surfaces 32, 33 face each other in the embodiment according to FIGS. 10 and 11.

Due to this arrangement of the annular sliding surfaces 32, 33 the two pads 28, 29 cannot be placed in the same position in the circumferential direction of the bearing 2. Instead they are displaced by a certain distance in the circumferential direction. In an embodiment the pads 28, 29 may be arranged in such a way that pads 28 of a first group with the orientation shown in FIG. 10 and pads 29 of a second group with the orientation shown in FIG. 11 alternate.

FIG. 12 shows a further variation of the discussed fluid film bearing 2. The overall design of the bearing 2 is similar to the bearing 2 discussed with reference to FIGS. 1-3 with an approximately I-shaped first part 7 supported radially by a group of pads 8 and axially by two groups of pads 20, 22. In the example shown in FIG. 12 the pads 20, 22 and the pad 8 are arranged at the same circumferential position. It would also be possible to use different circumferential positions for the pad 8 and the pads 20, 22 and/or to place the pads 20, 22 for the different directions of axial support at different circumferential positions.

The main difference between the embodiment discussed with reference to the FIGS. 1-3 and the embodiment according to FIG. 12 is the way that the pads 20, 22 for the axial support are mounted to the main body 11 of the second part 6. Instead of radially inserting them between the first part 7 and the main body 11, they are inserted into axial openings 47 of the main body 11 and attached to the main body 11 via a base plate 13 that extends over the opening, e.g. by screwing or bolting the base plate 13 to the main body 11. This approach was already discussed with reference to the bearing 8 with reference to FIG. 1.

The second part 6 is connected to the further component 5 via a connection 50 that lies outside of the pad 20, therefore allowing a removal of the pad 8 as well as of the pads 20, 22 in the respective directions indicated by the arrows 37 from an interior space 27 as discussed with reference to FIG. 1.

A further variant of the bearing 2 is shown in FIG. 13. The main difference to the bearing 2 shown in FIG. 12 is a different mounting of the pad 8. Instead of attaching the pad by a base plate 13, the support section 36 of the radial pad 8 is directly supported by the main body 11 of the second part 6. This can be advantageous when it is expected that the pad 8 will be strongly loaded, since these strong loads would have to be supported by screws or bolts fixing the base plate 13 to the main body 11 otherwise.

Another difference to the embodiment according to FIG. 12 is the placement of a connection 50 to the further part 5. In the embodiment shown in FIG. 13 the pad 20 therefore lies outside of the interior space 27 formed by the further part 5 and the bearing 2. While such an arrangement can make an exchange of the axial pad 20 more cumbersome, it can be advantageous in some cases, e.g. when a small diameter of the further part 5 is required.

Obviously, the features discussed with respect to the individual embodiments can be combined in the variety of ways. Also, the connection of the first and second part 6, 7 of the bearing 2 to various other parts of the wind turbine 1 can be varied. It is e.g. possible to form the first part 7 as one piece with the hub 3 and/or the structure 4 or to connect the outer part 7 to one or both of these pieces by a different connection, e.g. by a flange connection. Correspondingly it is possible to provide the further part 5 and the second part 6 as one piece or to connect them by a flange, etc. It would also be possible to use the first part 7 as an inner part and the second part 6 as an outer part of the bearing 2.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A fluid film bearing, comprising a first and second part rotatably connected to each other, wherein the first part comprises at least two annular sliding surfaces that extend in the circumferential direction of the fluid film bearing along the first part and that are arranged at an angle to each other, wherein the second part comprises a respective group of pads for each of the annular sliding surfaces, wherein a respective pad sliding surface of each pad in a respective group supports a respective annular sliding surface, wherein the pads of each group are distributed in a circumferential direction of the fluid film bearing along the second part, wherein the pads of a selected one of the groups are offset in the circumferential direction with respect to the pads of a further one of the groups, wherein the pads of these groups are placed in such a way that they would overlap in the axial direction if placed at the same circumferential position.

2. The fluid film bearing according to claim 1, wherein a number of the pads of the selected group in a first half of the circumference of the fluid film bearing is higher than a number of pads of the selected group in the second half of the circumference of the bearing and/or wherein pads of a first type are arranged in the first half of the circumference of the bearing and pads of a second type are arranged in the second half of the circumference of the bearing.

3. The fluid film bearing according to claim 1, wherein at least one pad of the selected one of the groups is arranged in such a way that the spacing of the pads in the selected group along the circumference is irregular and/or wherein the selected one of the groups comprises two different types of pads.

4. The fluid film bearing according to claim 3, wherein only one of the types of pads uses a coating to form the pad sliding surface or wherein the different types of pads use different materials for that coating and/or wherein the different types of pads use different materials to form a respective contact section of the pads carrying the coating or forming the pad sliding surface and/or different mechanisms to allow for a tilting of the contact section.

5. The fluid film bearing according to claim 1, wherein the annular sliding surface supported by the pad sliding surfaces of the pads of the selected group is arranged at an angle to a radial direction of the fluid film bearing.

6. The fluid film bearing according to claim 1, wherein the first part is an outer part of the fluid film bearing, wherein at least one of the annular sliding surfaces is formed on the inner circumference of the first part and/or wherein the respective pad sliding surface of the pads of at least one of the groups has a convex shape.

7. The fluid film bearing according to claim 1, wherein the first part forms an annular protrusion extending in the radial direction toward the second part, wherein the annular sliding surfaces are formed on the radial end of the protrusion and on both axial ends of the protrusion, wherein a first group of pads is arranged on one side of the protrusion and a second group of the pads is arranged on the opposite side of the protrusion in an axial direction.

8. The fluid film bearing according to claim 1, wherein the first part forms an inner or outer annular section and two annular protrusions extending in the radial direction toward the second part from the annular section, wherein the annular sliding surfaces are formed on the annular section and the inner faces of the annular protrusions facing each other, wherein all pads are arranged between the annular protrusions.

9. A wind turbine, comprising a rotor with a rotor hub that is connected to a further component of the wind turbine using the fluid film bearing according to claim 1, wherein the hub is part of the first or second part or mounted to the first or second part.

10. The wind turbine according to claim 9, wherein a number of the pads of the selected group in a top or bottom half of the circumference of the fluid film bearing is higher than a number of pads of the selected group in the other half of the circumference of the fluid film bearing and/or in that pads of a first type are arranged in the top half of the circumference of the bearing and pads of a second type are arranged in the bottom half of the circumference of the fluid film bearing.

11. The wind turbine according to claim 9, wherein the hub is connected to the further component by the single fluid film bearing.

\* \* \* \* \*